(12) United States Patent
Jain

(10) Patent No.: US 7,305,887 B2
(45) Date of Patent: Dec. 11, 2007

(54) PRESSURE INDICATING APPARATUS

(75) Inventor: Anand Kumar Jain, 15/B, S V Cooperative Industrial Estate, I.D.A., Jeedimetla, Hyderabad (IN) 500055

(73) Assignees: Anand Kumar Jain, Hyderabad (IN); Shailendra Kumar Suman, Charlotte ( * ) Notice: Subject to any disclaimer, the term of this patent is extended or adjusted under 35 U.S.C. 154(b) by 0 days.

(21) Appl. No.: 11/474,815

(22) Filed: Jun. 26, 2006

(65) Prior Publication Data

US 2007/0022816 A1 Feb. 1, 2007

(30) Foreign Application Priority Data

Jun. 24, 2005 (IN) .................. 746/MUM/2005

(51) Int. Cl.
*G01L 9/00* (2006.01)
(52) U.S. Cl. ........................................ 73/705; 116/288
(58) Field of Classification Search .......... 73/700–756; 116/288
See application file for complete search history.

(56) References Cited

U.S. PATENT DOCUMENTS 4,300,548 A * 11/1981 Jones .................... 128/204.21

* cited by examiner

*Primary Examiner*—Andre J. Allen
*Assistant Examiner*—Jermaine Jenkins
(74) *Attorney, Agent, or Firm*—Charles A. Muserlian

(57) ABSTRACT

A pressure indicating apparatus is disclosed. The apparatus indicates pressure change in a device, the apparatus comprises: a pointer, optical sensing means, a planar element and indicating means. The pointer moves in response to the change in pressure, which in turn moves the planar element. Light from the optical sensing means is incident on the planar element. The planar element varies the incident light, which is picked up by a conversion means. The conversion means converts light energy to electrical energy that is used to illuminate LED from an array of LED's or activates any one LCD component from the array LCD's in the display provided in the indicating means to indicate pressure.

14 Claims, 2 Drawing Sheets

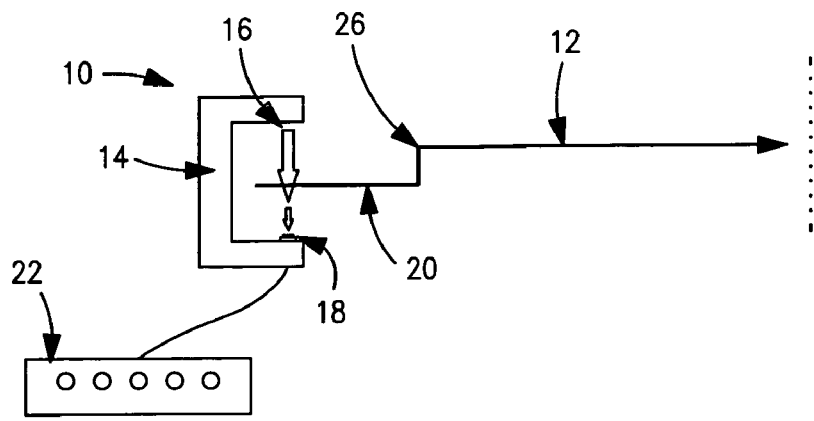
FIG. 1
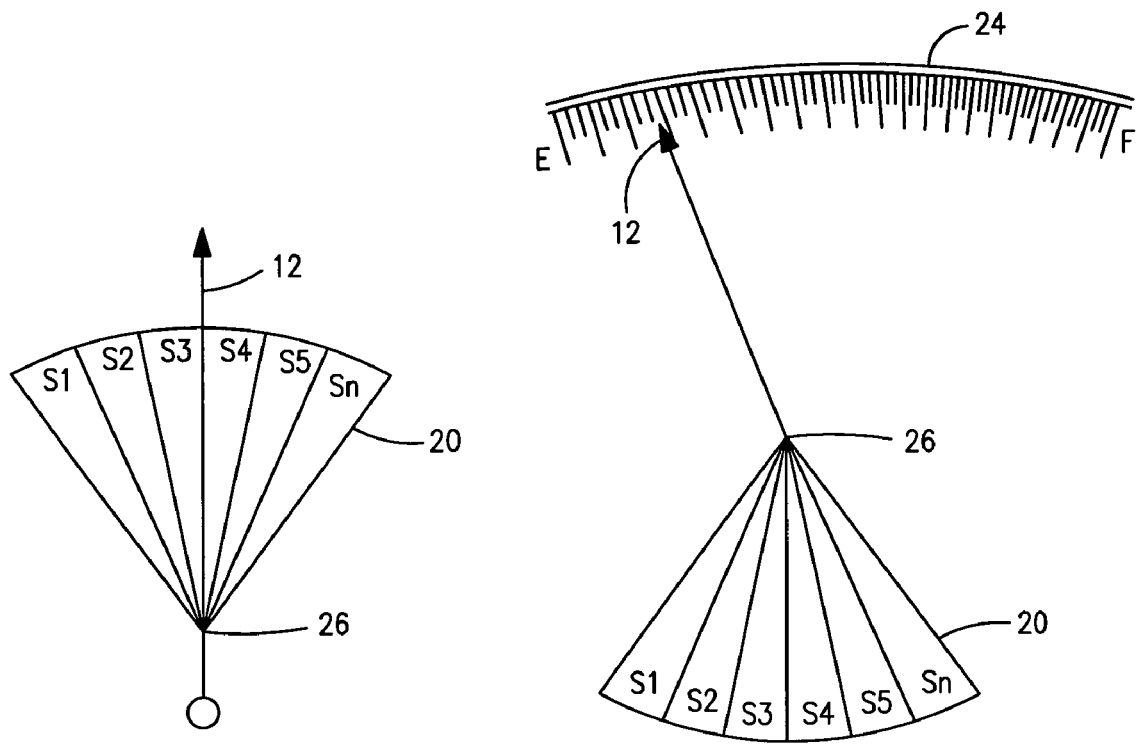
FIG. 3
FIG. 2

PRESSURE INDICATING APPARATUS

FIELD OF INVENTION

This invention relates to indicating pressure changes.

BACKGROUND OF THE INVENTION

1. Introduction

The use of gaseous fuels for a variety of purposes is very popular. Gaseous fuels like LPG/Propane are widely used. The use of LPG/Propane for domestic cooking purposes is very common. LPG/Propane is bottled in a cylinder at the LPG plant and delivered to households for use. LPG is also used as fuel in vehicles. The gas is filled into the cylinder using sophisticated equipment through a valve. Sealing components ensure that gas does not leak from the cylinder. The filled cylinders are then transported to dealers for distribution, which are delivered to the households. In case of vehicles the CNG cylinders are re-filled at gas stations, which have CNG re-filling terminals.

The cylinder/tank are in the shape of a bottle. A metal valve is provided at the operative top end of the cylinder. A regulator is connected to the valve, which will regulate the pressure of the gas inside the cylinder and delivers to the appliances. The inlet of the regulator is fitted on the outlet of the valve fitted to the cylinder.

The quantity of gas present in the cylinder depletes as it is used. The empty cylinders are then returned to the distributor and sent to the bottling plant for refilling. After refilling, these cylinders/tanks are sent to the distribution centers, which in turn deliver the cylinders to households.

However as the amount of gas in the cylinder depletes, it is not possible to manually check the amount of gas remaining in the cylinder. If a person using such gas cylinders does not have a spare cylinder, it would be necessary for the person to wait until a new re-filled cylinder is provided.

Hence there was a need for a device, which would provide an indication of the amount of gas remaining in the cylinder.

2. Prior Art

Conventionally a pressure guage is used for measuring pressure changes. A pressure usually consists of a closed coiled tube connected to the chamber or pipe in which pressure is to be sensed. As the pressure increases the tube will tend to uncoil, while a reduced pressure will cause the tube to coil more tightly. This motion is transferred through a link to a gear train connected to an indicating needle. The needle deflects in a particular direction to indicate the change in pressure. However this type of a pressure guage can be used on site or for online applications. Using conventional pressure guages it is not possible to indicate pressure changes to a remote location.

U.S. Pat. No. 6,095,142 illustrates pressure indicating device for self contained breathing apparatus includes a piston arrangement which is responsive to the relative pressures of the supply and the pressure at the outlet of the first stage regulator to assume several different positions in the containment housing. Piston position is recognized by electronic circuitry and an LED display is lighted accordingly to provide a series of unique signals to the user, of the remaining quantity of breathing fluid. However this device cannot be used for indicating pressure in a LPG cylinder.

U.S. Pat. No. 6,606,903 illustrates a pressure indicating device for securing to a tire valve is disclosed. The device includes a flexible impermeable diaphragm on one wall of a permanently hermetically sealed chamber is pressurized to a given pressure. A mechanical linkage moves depending on whether the pressure in a tire to which the device is attached, is greater or less than that in the chamber which rotates a bicolored ball so that the color displayed provides a visual signal that indicates if the tire pressure is above or below the given pressure. However this device cannot be extended for indicating pressure in a gas cylinder.

This invention seeks to overcome the limitations of the prior art.

An object of this invention is to provide a simple, efficient and inexpensive device for indicating the pressure of the gas remaining in a cylinder.

SUMMARY OF THE INVENTION

In accordance with this invention there is provided a pressure indicating apparatus, adapted to indicate pressure of gas in a device, said device comprises:

(i) a pointer, adapted to move in response to the pressure changes in said device;

(ii) an optical sensing means having light emitting means and means for converting incident light to signals proportional to the light incident;

(iii) a planar element cooperating with said pointer means and optical sensing means to vary the light on the converting means in response to the movement of the pointer;

(iv) indicating means cooperating with said optical sensing means to indicate pressure in response to said signals.

Typically, said device is a gas cylinder.

Typically, said planar element is secured to said pointer in a manner such that said planar element extends from said pointer.

Typically, said planar element is integral with said pointer.

Typically, said planar element is secured to said pointer.

Typically, said planar element has discrete areas of variable transparency.

Typically, said planar element is in the form of a sector of a circle and said areas are secants.

Typically, said pointer and planar element are made of non-conductive material.

Typically, said apparatus includes a scale marked from full to empty on which said pointer moves.

Typically, said optical sensing means is fitted to said pointer and moves with said pointer.

Typically, said optical sensing means is integral to said pointer.

Typically, said planar element is stationary.

Typically, said planar element is made from a material which is at least one selected from a group of materials consisting of paper, coloured paper, natural or synthetic polymeric material, gelatin film or a combination thereof.

Typically, said apparatus is housed in a protective housing.

In another embodiment of this invention the planar element is stationary and the optical sensing means is secured to the pointer means. Hence the optical sensing means moves with the movement of the pointer. In such a configuration the optical sensing means extends from the pointer.

BRIEF DESCRIPTION OF THE ACCOMPANYING DRAWINGS

The invention will be described in detail with reference to a preferred embodiment. Reference to this embodiment does not limit the scope of the invention.

In the accompanying drawings:

FIG. 1 illustrates the side view of the overall device in accordance with this invention;

FIG. 2 illustrates a plan view of the pointer means along with the element;

FIG. 3 illustrates an alternative arrangement of the pointer and element of FIG. 2.

DETAILED DESCRIPTION OF THE ACCOMPANYING DRAWINGS

Figure 4:
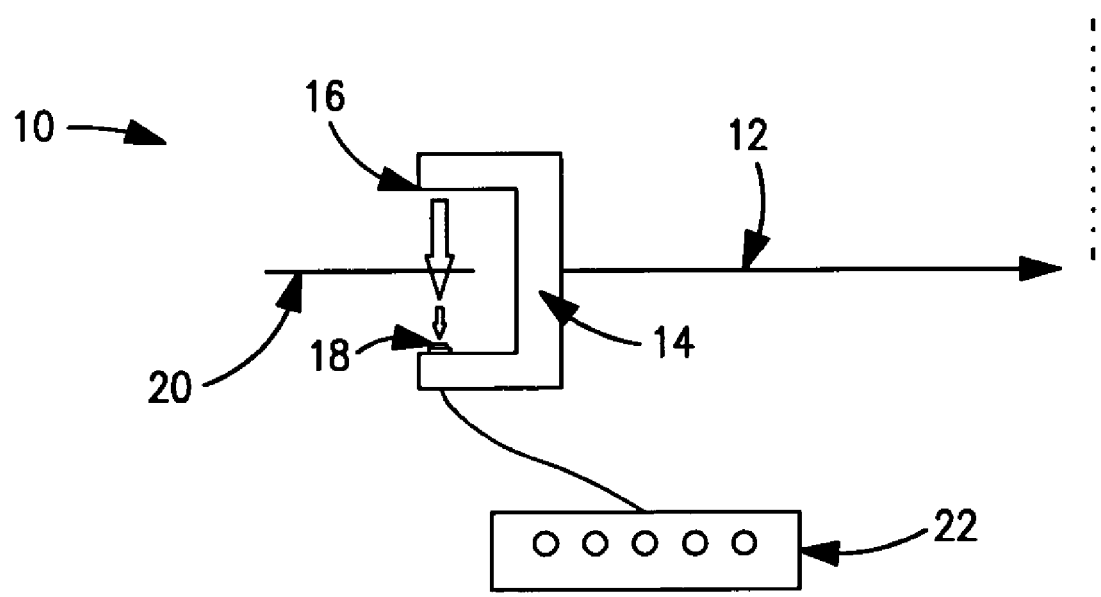
FIG. 4 illustrates the side view of the overall device in accordance with another embodiment of this invention.

The invention will now be explained with reference to FIGS. 1 to 3 of the accompanying drawings.

FIG. 1 illustrates the side view of the pressure indicating apparatus in accordance with this invention. The apparatus is housed in a protective housing (10), which provides dust free, smoke free, moisture free working environment for the various parts of the pressure indicating apparatus. The pointer (12) is adapted to move in response to the pressure changes in a gas cylinder. The optical sensing means (14) has a light emitting means (16) and means (18) for converting incident light to signals proportional to the light incident. The planar element (20) cooperates with the pointer (12) and optical sensing means (14) to vary the light on the converting means (18). Indicating means (22) cooperates with the optical sensing means (12) is provided which provides pressure indication in response to the signals generated by said optical sensing means (14).

The pointer (12) moves on the scale (24) marked from full to empty, full being indicated by the alphabet F and empty being indicated by the alphabet E on the scale. The planar element (20) is secured to the pointer (10) or is integral with the pointer (12). The element (20) has discrete areas of variable transparency and is in the form of a sector of a circle and the areas being secants (as particularly seen in FIG. 2 and FIG. 3 of the accompanying drawings). The planar element (20) and the pointer (12) move in unison with each other. The pointer (12) and planar element (20) are made of non-conductive material.

The optical sensing means (14) is a photoelectric sensor. The optical sensing means (14) has a light emitting means (16) and a conversion means (18). The light emitting means emits the light in the direction of the conversion means. The planar element is placed in a manner such that the light emitted by the light emitting means (16) is obstructed by the element (20) before some part of the incident light is transmitted to the conversion means (18). Depending on the opacity or transparency of the sector of the planar element (20) on which the light is incident, light is transmitted towards the conversion means (18). The amount of light picked up by the conversion means (18) is then converted to an equivalent amount of electrical signal. The electrical signal is used to illuminate a particular light emitting diode from the array of light emitting diodes or activate any one LCD component from the array of LCD's provided in the display, provided in the indicating means (22), which indicates the pressure of the gas remaining in the gas cylinder which in turn gives the display of the level of liquefied gas available in the cylinder. The number of LED's glowing at a particular moment the number of LCD components active are indicative of the pressure of the gas remaining in the gas cylinder. An audio indication such as an alarm or a video indication may alternatively be provided as indicating means (22). Alternatively sensing means such as Hall effect sensors, magnetic sensor, capacitive sensors, stroboscopic sensors and the like may be used instead of optical sensing means (14).

FIG. 2 illustrates a plan view of the pointer (12) along with the planar element (20) and FIG. 3 illustrates an alternative arrangement of the pointer (12) and planar element (20) of FIG. 2. The element (20) has discrete areas of variable transparency and is in the form of a sector of a circle and the areas being secants numbered S1, S2 . . . Sn depending on the number of discrete sectors or secants. The planar element (20) extends longitudinally from the pivot point (26) as shown in FIG. 3. In this configuration the element (20) moves in a direction opposite to the movement of the pointer (12). In the alternate configuration shown in FIG. 3 the planar element (20) moves in the same direction as the pointer (12). The discrete areas of the planar element (20) are made of a material which is at least one chosen from a group of material including different grades of paper, different colours of a same grade of paper, natural and synthetic polymeric material, gelatin film and the like. The areas of the planar element (20) are either fully transparent, semi transparent or fully opaque. Depending on the area on which the light from the light emitting means is incident light energy is converted to electrical energy. In the configuration shown in FIG. 2 and FIG. 3, the planar element moves in unison with the movement of the pointer.

FIG. 4 illustrates the side view of the overall device in accordance with another embodiment of this invention. The optical sensing means (14) is fitted to the pointer (12) or is integral with the pointer (12). Hence the optical sensing (14) means moves in unison with the pointer (12). The planar element (20) is stationary. The optical sensing means is self powered and does not require an external source of power. The apparatus it is housed in a protective housing (10) which keeps the apparatus away from dust, smoke, water, moisture and other agents that would reduce the transparency of the planar element (20) and therefore reduce the ability of the planar element (20) to vary the light incident on the conversion means (18).

The method in which the apparatus indicates pressure can be explained as follows. The apparatus is connected to a valve fitted to the cylinder. As the gas in the cylinder is used the pressure of gas in the cylinder reduces. The reduction in pressure is indicated by the pointer (12), which moves on a scale (24). As the pointer (12) moves the planar element (20) which is secured to the pointer (12) also moves. The planar element (20) has discrete areas of varying transparency which is used to vary the amount of light incident from the emitting means (16) to the conversion means (18), depending on the amount of light incident the conversion means (18) converts the light energy to equivalent electrical energy which is used for illuminating at least one light emitting diode from an array of LED's or activates any one LCD component from the array LCD's in the display, provided in the indicating means (22) which indicate the pressure change in the gas cylinder. The scale over which the pointer moves can be calibrated for use in a gas pipeline.

While considerable emphasis has been placed herein on the various components of the preferred embodiment and the interrelationships between the component parts of the preferred embodiment, it will be appreciated that many alterations can be made and that many modifications can be made in the preferred embodiment without departing from the principles of this invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A pressure indicating apparatus, adapted to indicate pressure of gas in a device, said apparatus comprising:
   (i) a pointer, adapted to move in response to the pressure changes in said device;
   (ii) an optical sensing means having light emitting means and means for converting incident light to signals proportional to the light incident;
   (iii) a planar element cooperating with said pointer means and optical sensing means to vary the light on the converting means in response to the movement of the pointer; and
   (iv) indicating means cooperating with said optical sensing means to indicate pressure in response to said signals.

2. A pressure indicating apparatus as claimed in claim 1, wherein said device is a gas cylinder.

3. A pressure indicating apparatus as claimed in claim 1, wherein said planar element extends from said pointer.

4. A pressure indicating apparatus as claimed in claim 1, wherein said planar element is integral with said pointer.

5. A pressure indicating apparatus as claimed in claim 1, wherein said planar element is secured to said pointer.

6. A pressure indicating apparatus as claimed in claim 1, wherein said planar element has discrete areas of variable transparency.

7. A pressure indicating apparatus as claimed in claim 1, wherein said planar element is in the form of a sector of a circle and said areas are secants.

8. A pressure indicating apparatus as claimed in claim 1, wherein said pointer and planar element are made of non-conductive material.

9. A pressure indicating apparatus as claimed in claim 1, which includes a scale marked from full to empty on which the pointer moves.

10. A pressure indicating apparatus as claimed in claim 1, wherein said optical sensing means is fitted to said pointer and moves with said pointer.

11. A pressure indicating apparatus as claimed in claim 1, wherein said optical sensing means is integral with the pointer.

12. A pressure indicating apparatus as claimed in claim 1, wherein said planar element is stationary.

13. A pressure indicating apparatus as claimed in claim 1, wherein body of said planar element is made from a material which is at least one selected from a group of materials consisting of various grades of paper, coloured paper, natural or synthetic polymeric material, gelatin film and a combination thereof.

14. A pressure indicating apparatus as claimed in claim 1, wherein said apparatus is housed in a protective housing.

* * * * *